Figure 1:
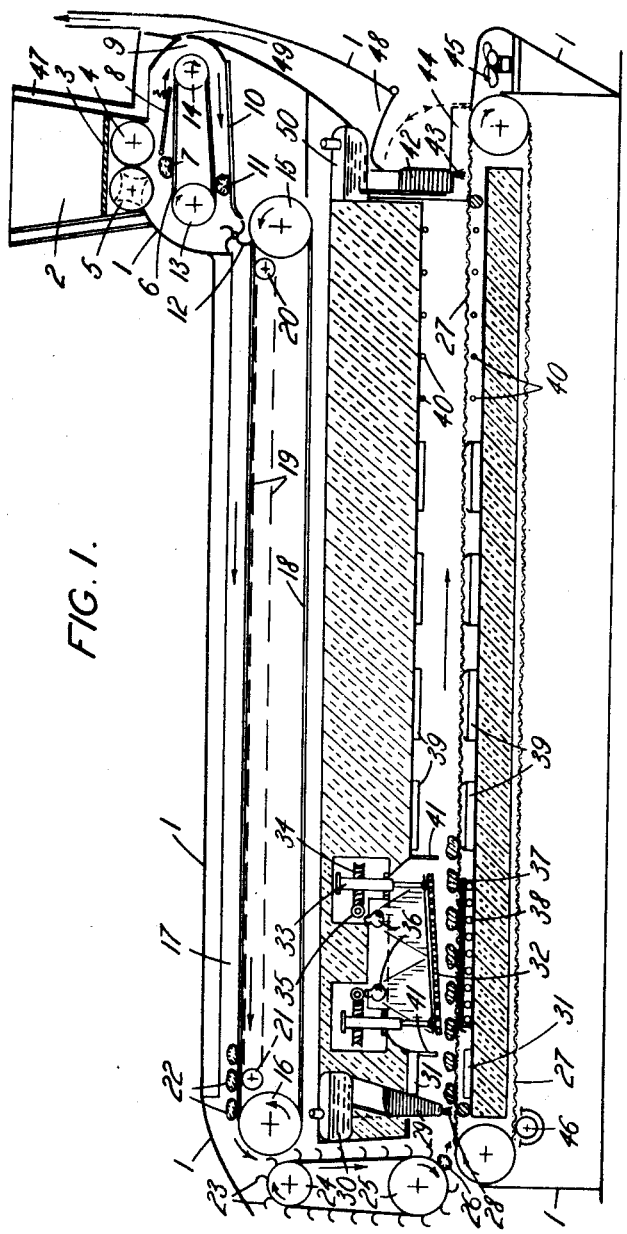

June 28, 1960

J. L. LUC 2,942,562

OVEN

Filed Sept. 7, 1956

4 Sheets-Sheet 1

INVENTOR
JACQUES L. LUC

By
Watson, Cole, Grindle & Watson
ATTORNEYS

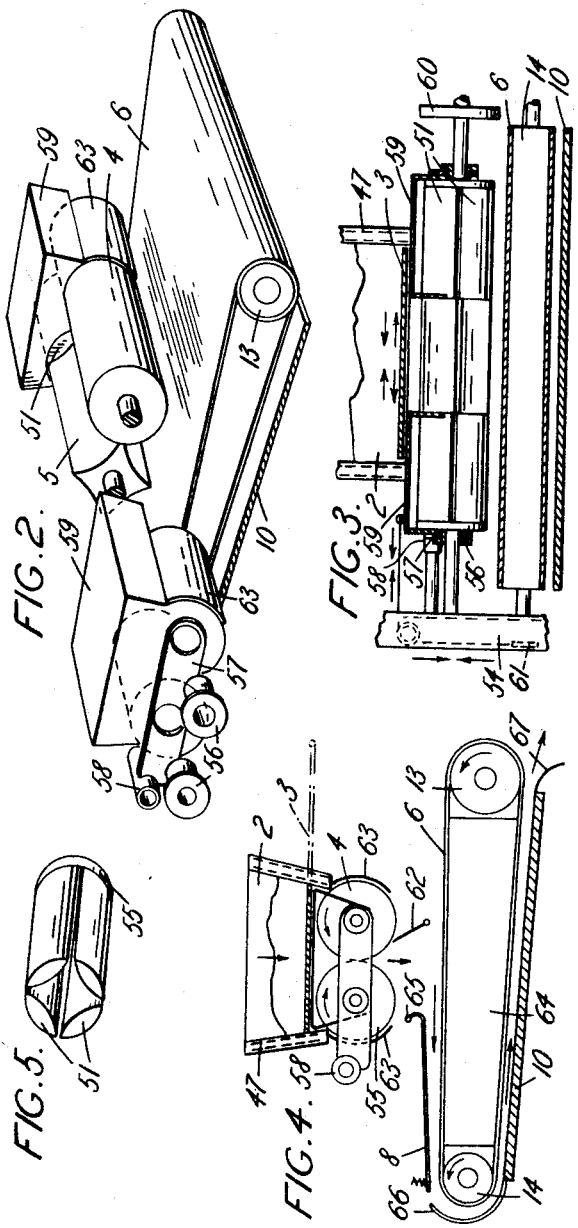

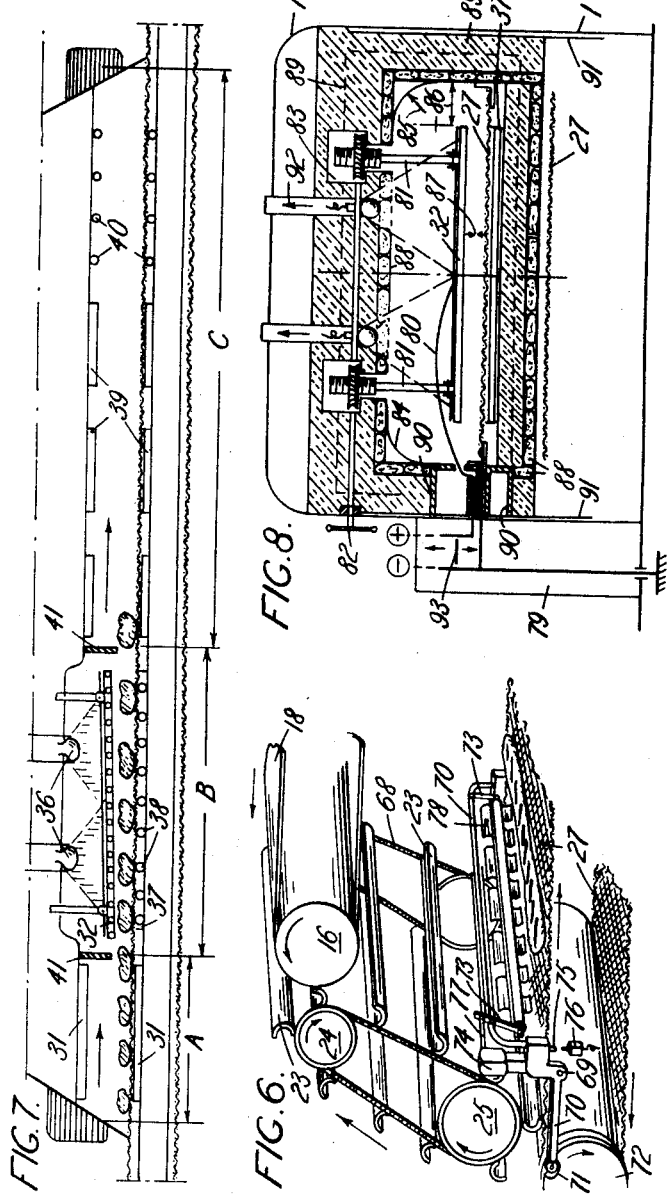

June 28, 1960
J. L. LUC
2,942,562
OVEN
Filed Sept. 7, 1956
4 Sheets-Sheet 4
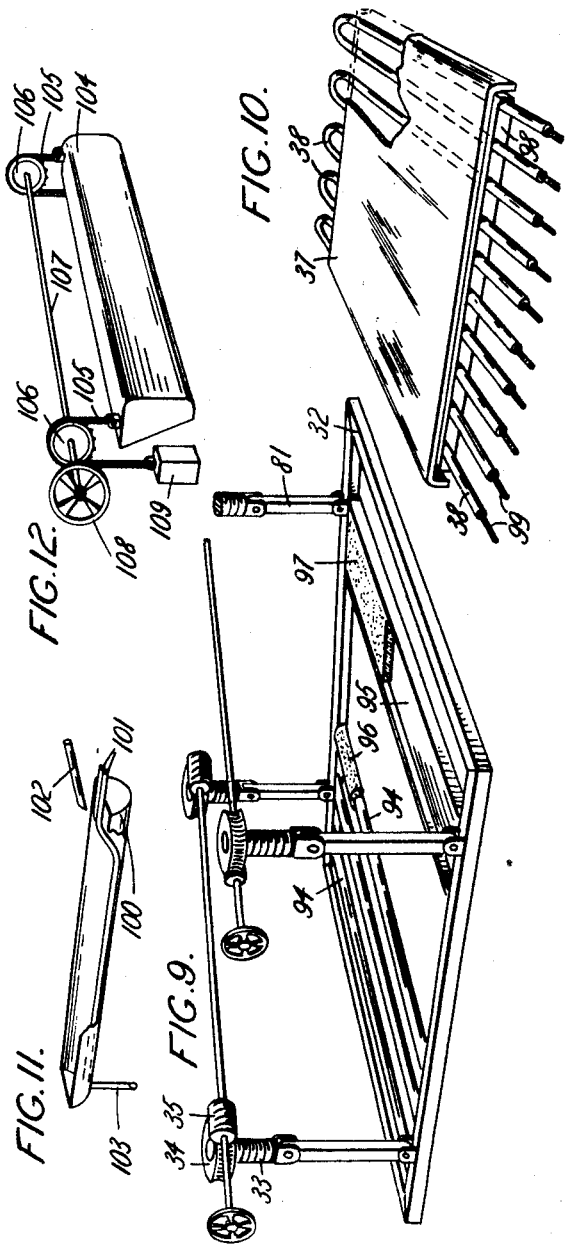
INVENTOR
JACQUES L. LUC
By Watson, Cole, Grindle & Watson
ATTORNEYS

United States Patent Office 2,942,562
Patented June 28, 1960

2,942,562

OVEN

Jacques Louis Luc, Provins, France, assignor to Kemper Limited, London, England, a British company Filed Sept. 7, 1956, Ser. No. 608,536

Claims priority, application France Sept. 16, 1955

5 Claims. (Cl. 107—54)

The invention relates to ovens for use in baking flour products such as bread and confectionery (fermented or unfermented) and like dielectric products and to a method of baking such products.

It is an object of the invention to enable the advantages of high frequency electric heating to be obtained for the baking of bread and like products while avoiding or reducing the disadvantages of that method of heating. A further object of preferred forms of the invention is to provide for the automatic baking under hygienic conditions of bread and like products, starting with a previously kneaded dough or the like.

It has already been proposed to bake bread by the simultaneous use throughout the baking process of a high frequency field and of infra-red radiation. This simultaneous use of high frequency heating and infra-red heating is however unsatisfactory for the baking of bread and the like. In order that the leavening may have time to act before it is destroyed by temperatures of above 45° to 50° C. it is necessary that the initial heating to temperatures of 45° to 50° C. should be slow and that this temperature should be maintained for a suitable time. This is incompatible with the economic use of high frequency heating which is essentially rapid in operation. Furthermore the action of the infra-red heating is to form, prematurely, a crust on the product which prevents the proper swelling or expansion of the product.

The present invention provides the method of baking flour products such as bread and confectionery which comprises first heating the products externally (e.g. by long-wave heat radiation) without formation of substantial crust and then heating the products internally by high-frequency dielectric heating with or without simultaneous external heating.

The external heating may be effected by electrical resistances, oil, gas, steam pipes or like means.

In carrying out the method the first stage may raise the temperature to about 40° C., preferably not more than 45°–50° C. and the second stage may raise the temperature to about 60–70° C., at which temperature the gluten is coagulated and the starch converted to starch paste. The temperature may then be raised further (e.g. to about 98°–100° C.) to dry the bread to a suitable extent and to complete the crust formation. The further heating (e.g. for crust formation) may be by external heating means.

The invention also provides an oven for baking flour products, such as bread, or other dielectric products which comprises means for first heating the products externally (e.g. by long-wave radiation) and for then heating the products internally by high frequency dielectric heating, preferably without simultaneous external heating.

Preferred features which may be incorporated in the oven include a pre-heating or fermenting chamber which may be on top of the oven chamber, conveyors for conveying the products through the fermenting and oven chambers, means for automatically dividing dough into pieces of predetermined volume for feeding to the fermenting and oven chambers by the conveyors, means for automatically shaping the pieces of dough as they pass to the oven and means for making incisions in the pieces of dough before they enter the oven chamber. These several means may be constructed as sections of the complete oven and arranged for selective operation as required.

A specific construction of an oven according to the invention and the method of use for baking bread will now be described, by way of example, with reference to the accompanying diagrammatic drawings in which:

Figure 1 is a diagrammatic section through the oven, omitting certain parts for clarity, Figure 2 is a perspective view, partly exploded, of the dividing and measuring means and also the shaping means, the feed hopper being omitted, Figure 3 is a front view, partly in section of the means shown in Figure 2, Figure 4 is a side view of the means shown in Figure 2, Figure 5 is a perspective view of one of the elements and side plate asemblies used in the measuring device shown in Figures 2–4 inclusive, Figure 6 is a perspective diagrammatic view showing a vertical conveyor used to carry the dough pieces downwardly from the fermenting chamber to the oven chamber and also means for making incisions in the pieces of dough and part of a conveyor for carrying the dough pieces through the oven chamber, Figure 7 is a longitudinal section through the oven chamber, showing diagrammatically the several heating stages, Figure 8 is a cross section through the oven chamber, Figure 9 is a perspective view of the upper high-frequency electrode showing a modification which may be adopted and means for adjusting the height of the electrode, Figure 10 is a perspective view of the lower high-frequency electrode, Figure 11 shows a device for producing steam in the oven chamber, and Figure 12 is a perspective view showing one of the doors of the oven.

The principal features of the oven and its mode of operation will be described first and then the details of construction of the several sections will be described.

The oven 1 is wholly enclosed or hooded which assists cleanliness and reduces heat radiation to the surrounding premises. Its design, which includes the location of a fermentation chamber above the oven chamber, facilitates its installation in restricted spaces such as, for example, a motor vehicle, a boat or a railway coach.

As seen more especially in Figure 1 the assembly comprises at the top a feed hopper 2 for supplying the dough. The hopper is surrounded by a jacket 47 connected to a conduit 48 for leading hot vapours from near the oven exit to the jacket. The amount of the vapours fed to the jacket is controlled by a damper 49 which enables the temperature of the dough in the hopper to be controlled.

A slide 3 is provided for closing the bottom of the hopper.

Beneath the hopper is a pair of "weighing" or measuring cylinders 4 and 5. These are driven by gears in opposite directions and one is provided with part-cylindrical cavities adjustable in length. When the slide 3 is open dough is fed from the hopper into the cavities and is compressed therein to divide it into measured or "weighed" pieces which fall down onto a belt 6 of compressed felt which conveys the pieces, as with the piece illustrated at 7, weighed and roughly shaped to cylindrical form towards a felt covered plate 8 which is pivotally supported at the entrance end and which is spring urged downwardly at its exit end. The piece of dough 7 is carried by the belt 6 under the plate 8 and as a result of the compression by the plate begins to extend in length. After leaving the plate 8 the dough is carried by the belt 6 into a tapering and restricted passageway 9 formed by the return of the belt around drum 14 and by the fixed wall 66 of the assembly. The dough 7, still carried along by the belt is thus rolled between the belt and a felt covered plate 10. The outlet end of plate 10 is adjustable up and down so that the passage between the belt and the plate may be caused to taper, more or less, and the dough therefore compressed, with consequential elongation, to adjustable amounts as it is rolled along the plate.

On leaving the plate 10 each elongated piece of dough 11 is fed onto one of the backwardly curved blades of a "regulator" 12, the plate 10 being curved downwardly at its outlet end away from drum 13 thereby to lead the dough to the regulator. The regulator, which rotates at the same speed as the drums 13 and 14—which in practice are of the same size—and the cylinder 5, deposits the elongated dough pieces one at a time gently onto a belt 18 which runs along the raising or fermentation chamber 17, the belt being supported and driven by rollers 15, 16. The blades of the regulator are covered with felt coated or impregnated with a silicone resin.

To provide a support for the belt 18, which is formed of felt or other suitable material coated or impregnated with a silicone resin, there is a belt 19 with metallic reinforcement which is guided along its edges by angle members and runs over drums 20, 21.

The pieces of dough are carried by the belt 18 through the raising or fermentation chamber 17 which consists of a simple metallic tunnel. In use the chamber is maintained at an internal temperature of about 30° C. and the atmosphere inside is kept moist. For this purpose and with a view to economy some of the excess steam from the underlying oven chamber (later described) is recovered and passed to the fermentation chamber. This steam is conducted to the fermentation chamber through one or more pipes (not shown) equipped with adjustable butterfly valves and leading from the oven chamber upwardly into the fermentation chamber. The speed at which the pieces of dough travel through the fermentation chamber is fixed and is chosen in relation to the length of the chamber, the time required for fermentation, and the temperature setting for the oven chamber.

After having travelled the length of the fermentation chamber the pieces of dough 22 drops one at a time from the belt 18 into downwardly moving troughs 23 of a vertical conveyor, examples of suitable times and temperatures being given later.

At the bottom of the vertical conveyor, which runs over rollers 24 and 25, the fermented pieces of dough at 26 drop onto a conveyor belt 27 which carries them through the oven chamber. The belt 27 which is woven of steel wire with an open mesh is coated on its outer surface with enamel containing a silicone resin to limit adhesion of the dough and in use is coated with oil by an oiling cylinder 46. The enamel is not applied to the inner surface of the belt so that this surface remains electrically conductive and will make good electrical contact with the lower high-frequency brass electrode 37 later described.

The belt 27 has, in this example, a surface speed which is twice that of the belts 6 and 18 which permits the raising time (e.g. 40 minutes) to be twice the total baking time, as is desirable, and also increases the spacing between the loaves in the oven chamber.

On their way from the vertical conveyor to the oven the pieces of dough pass under a device which makes incisions in the top of the dough. This device has been omitted from Figure 1 for the sake of clarity but is shown in detail and in relation to the adjacent parts, in Figure 6 and is described in greater detail later.

After the incisions have been made, the pieces of dough are carried through a fire-resisting "curtain" 28 which is in the form of a brush (e.g. of heat resisting animal or vegetable fibres) and is supplied with a liquid (water, oil or the like) which wets the tops and sides of the dough pieces. The brush is secured to and depends from the bottom of a hollow vertically sliding door 29 and permits the dough pieces to pass freely into the oven while at the same time reducing the loss of heat from the oven chamber through the entrance. A similar arrangement is provided at the exit from the chamber as shown at 42, 43. The liquid is supplied to the curtain 28 by means of a flexible pipe leading to feed orifices in a channel at the bottom of the door at the roots of the bristles from a reservoir 30 situated above the door, and a liquid is similarly supplied to the curtain 43 from a reservoir 50.

The pieces of dough having passed through the curtain 28 and being covered with a thin film of water or other liquid enter zone A (Figure 7) where they are subjected to progressive external heating by radiation from upper and lower heating elements 31. These elements may be electrical resistances, gas tubes, steam pipes or hot air pipes or the equivalent but they should not be substantial emitters of infra-red rays. These rays are to be avoided because, being of short wave-length, they cause premature formation of a crust or casing which it is essential to avoid because it prevents proper swelling of the dough under the action of the heat and of the carbon dioxide gas contained in the cells of the dough. The length of these elements and their power are chosen, in relation to the masses to be heated (i.e. proportional thereto) so that the dough reaches a temperature of about 30°–40° C. (it enters at about 25°–30° C.) and does not exceed a temperature of 50° C. so as to avoid killing or destroying the action of the leaven. The time of heating may for example be about five minutes. Thereafter the dough pieces are conveyed into the zone of a high-frequency electric field—the frequency being about 13,560,000 cycles per second—(Zone B in Figure 7) where they reach their maximum swelling and are subjected to internal heating or combined internal and external heating. In this zone the dough is heated in about 8 minutes to about 70° C.

The high-frequency field is produced by means of two plates or electrodes 32, 37, connected electrically to a source of high frequency alternating or fluctuating direct current. The voltage is varied with constant amplitude and with respect to time, e.g. sinusoidally, at the output of the source and the frequency is adjustable, an increase in frequency resulting in an increase in the internal heating of the dough which may be considered as a dielectric.

The upper electrode 32 is adjustable in position as later described.

The lower electrode 37 is connected to its own terminal and consists of a metal plate (in this example brass) of substantially the same dimensions as the upper electrode. It serves as a support for the belt 27 and it also serves, as later described, as a housing for heating elements 38 which provide uniform external heating for the underside of the products to form a strength giving crust or base surface thereon.

Above the electrode 32 there are infra-red emitters 36. These emitters, which are lamps of well known construction in themselves serve to heat the electrode 32 and so to prevent steam condensation thereon without unduly raising the oven temperature. In order to avoid premature crust formation it is desirable that the infrared rays shall not pass through the electrode onto the products. For this reason the rays are screened from the products, thus the electrode may be of closed formation or a screen plate be placed on top of it.

Screens 41 isolate the high frequency electrodes from the heating elements 31 and 39.

On leaving the high frequency field, the loaves or other products enter zone C (Figure 7) where they are subjected only to the external heating action of crust-forming members 39 and 40. These members may be electrical resistances, gas, steam or hot air pipes or the like. The members 39 are followed by similar but less powerful members 40. The members 39 are intended to caramelize the sugars or amylaceous substances in the flour at the surface of the products and the members 40 to increase the thickness of the crust. The time of heating in this zone is about seven minutes and the internal temperature of the dough reaches about 100° C. The oven temperature is about 270–280° to effect the crust formation.

The temperature of members 39 and 40 is regulated automatically from a control panel to maintain the desired temperature. For example when electric resistance heating is used the current may be turned on and off automatically.

As already explained there is, at the exit from the oven chamber, a brush or curtain 42. This brush is wetted with water or other substance which will cause the surfaces of the loaves to become brown and which is transferred to the loaves.

Immediately after the brush 43 there is a cover or canopy 44 which encloses a space without heating means and in which the film of water or other liquid used to brown the products is evaporated.

At the end of the oven there is a delivery station beneath which there is a fan 45 which acts to cool the loaves leaving the oven and to tend to drive back into the oven chamber vapours which tend to leave it or to drive into the open lower end of a conduit 48 any vapours which do escape from the canopy 44.

The several sections of the apparatus will now be described in greater detail beginning with the weighing or measuring and the shaping sections which are shown in Figures 1–5 inclusive.

In the construction shown the cylinder 4, which is of polished aluminum, is smooth and rotates slightly faster than the cylinder 5 which, also of polished aluminium, is provided with four part-cylindrical longitudinal grooves. More or less than four grooves may be provided if desired.

As alternatives to aluminium there may be used steel or other metal plated with chromium or covered with an enamel containing a silicone resin or with polytetrafluorethylene.

In the arrangement shown, since the smooth cylinder rotates faster than the cylinder 5 it to some extent forces the dough to enter the groove in the opposite cylinder 5 and compresses it. On leaving, the dough escapes all the better because it is helped by the smooth cylinder which draws it downwards.

As seen in Figures 2, 3 and 5, the cylinder 5 is provided in this example with four grooves or cavities, in which are provided two sets of moveable members 51, each set having a side plate 55 secured to the outer ends of its members. The members 51 are actuated by a screwed shaft (not shown), machined in such a manner as to comprise a certain length of "right-hand" threading for the right-hand members and "left-hand" threading for the left-hand members, said screw threads making right and left hand threaded engagements respectively with two nuts 58 which are operatively connected to right and left hand members 51 as later described. Rotation of this screwed shaft, by means of a hand-wheel for example and with reference to a suitable scale, enables the members 51 to be moved forwards or backwards laterally, producing by this operation, a larger or smaller cavity, and since the apparatus works on the principle of volumetric measurement, a larger or smaller piece of dough is obtained.

The forward and backward movement of the movable members 51 can easily be effected in view of the fact that the assembly of members and side-plate 55 at each side is held by two flanged bushes 56. These bushes pass through holes in a guide plate 57 near to the ends thereof and are fixed within the side plate 55. The plate 57 is retained between the flanges and the side plate 55. To each plate 57 there is welded one of the above-mentioned nuts 58 so that rotation of the screwed shaft aforesaid moves the two nuts and hence the guide plates 57 and the opposed sets of members 51 towards or away from one another.

Likewise fixed to the two guide plates 57 are boxes 59, sliding inside the feed hopper 2. In view of the fact that the vertical portion of the said boxes on the inside, is directly above the inner ends of the members 51, this arrangement permits the dough to flow only into the interior of the cavities.

The slide 3 slides on the tops of the boxes 59 and may be used to prevent any flow of the dough during the operation of the assembly if, for example, it is desired to bake other products than those supplied by the weighing device.

A driving pinion for the cylinders is shown at 60 and a slide for indicating the extent of separation of the opposed sets of members 51 is shown at 61. The slide is connected to one of the boxes 59 (which move with the members 51) by a flexible chain passing over a pulley supported in a frame member 54.

At the bottom of the smooth cylinder 4 is a scraper 62 (Figure 4) which cleans the said cylinder and prevents any dough which has adhered thereto from going back up into the hopper. As seen in Figures 2 and 4 there are two covers 63 which embrace the cylinder 4, and the cylinder 5 and its members 51. As these latter are fixed to the side-plates, by their end and also to the boxes 59, the covers 63 prevent gaping or spreading of the said members. It should be noted that any system of lubrication tending to prevent the adherence of the dough to the walls of the cylinders may be provided on these covers.

The plate 8 is pivotally supported at one end 65 and urged downwardly at its other end by springs. The plate 8, the wall 66 and the plate 10 are covered with felt.

Whereas the shaft of the cylinder 14 is fixed, that of the cylinder 13 may be made adjustable up and down by any means. This arrangement, which is an alternative to that previously described, permits the table 10, and its delivery tray 67 to be at a fixed heght in relation to the regulating member 12 while at the same time permitting adjustment of the space between the table and the belt. The cylinders 13, 14 are driven by a chain.

Figure 6 shows in detail the vertical conveyor which enables the fermented pieces of dough to be lowered from the raising chamber 17 to the baking belt 27 of the oven.

This conveyor consists of two drums 24 and 25, each consisting of a shaft (not illustrated) and two toothed pinions. Fixed to each pair of pinions is a chain 68 to the spaced links of which are fixed the troughs 23, made of perforated sheet metal and covered with cloth. The chains 68 may be replaced by a belt to which the troughs are secured.

The fermented pieces of dough arriving by means of the felted belt 18, from the raising chamber 17, drop one by one into the troughs 23. The whole assembly works at the same tempo—the speed of rotation of the cylinders 4, 5, the drums 13, 14, the regulator 12 and the drums, 15, 16 being equal—and the pieces of dough are lowered towards the baking belt 27 of the oven, onto which they drop.

Having reached this stage, the pieces of dough have incisions made in their tops. The apparatus (see Figure 6) for effecting the incisions is a metallic frame 70, articulated on a shaft 69 and having a rocking movement imparted to it, by means consisting, at each side of the machine, of a roller 71 which engages in depressions in a ratchet wheel 72 fixed to the shaft of the drum of belt 27.

The circumferential distance between the axes of these depressions is the same as the distance between the pieces of dough.

At the top of the frame 70 is attached a second frame composed of two links 73 and a cross-shaft carrying blades 78. To this frame a reciprocating movement in the lateral direction of the belt 27 is imparted by means of two links 73, on the one hand and an electro-magnetic coil 74 on the other hand. The links are pivoted to frame 70 about axes which extend in the lengthwise direction of the belt and are universally pivoted to the cross-shaft of the second frame at their lower ends. The upper end of one link 73 extends above frame 70 and is pivoted to a transverse link 77 of which one end is attached to the armature of a solenoid 74. The solenoid 74 is de-energised when the roller 71 is at the base of one of the depressions and energised when it is at the top thereof. At this moment, since the frame has rocked backwards, a contact blade 75 establishes the current with the contact-breaker 76, which actuates the coil, obliging the latter strongly to attract the armature 77, which then actuates the frame provided with blades 78 which are slightly bent back and inclined. At the moment when the roller 71 drops back into the bottom of one of the depressions in the ratchet wheel, the frame rocks forwards, cutting off the current. Since the coil is no longer energised a return spring (not illustrated), restores the frame provided with blades to the opposite position.

As illustrated in Figure 6, the said second frame comprises a plurality of alternative sets of blades, depending on the number of incisions which are desired and which can be easily selected without stopping the whole assembly. The selection is made by rotation of the blades and cross-shaft within the links 73. The blades may be varied to suit the market for the loaves.

The interior of the baking chamber casing is made of polished sheets of Duralumin (trademark) forming a screen and a deflector. The upper portion of the chamber has rounded corners 84 (Figure 8) so as to avoid sharp angles in the vicinity of the "hot" electrode 32. The radius 85 and the distance 86 of the electrode 32 from the walls of the oven are both at least equal to the distance 87 (i.e. the maximum separation of the electrode from the metal belt 27) plus 10 percent.

The baking chamber casing is encased in a wall of concrete bricks 88 with insulating material 89 on the outside, this material consisting of a layer of slag wool known under the trademark Stillite covered by a layer of vermiculite, the dividing line being indicated by the dash line in Figure 8.

The electrical connections to the electrodes 32, 37 are electrically screened in order to reduce radiation and are enclosed, where they pass through the heat insulating walls, in an aluminum casing which is divided internally by steatite partitions 90. The connection 80 (Figure 8) to the electrode 32 consists of a copper strip which provides flexibility for the up and down adjustment of the electrode and is suitable for conducting the high frequency currents, this connection being taken from the hot terminal of a high frequency generator 79. Aluminium plates 91 are placed under the cover sheets 1, to serve as screens. The electric cables which pass close to the electric field are encased in aluminium sheaths. The installation is provided with port holes so that the course of the baking may be followed, these port holes being coated with lead to reduce radiation.

As seen at the top of Figure 8, two chimneys 92 are provided for circulation of cooling air or vapours around the infra-red lamps 36 and for their replacement if necessary.

The high-frequency current generator 79 is of any known construction suitable for production of the high frequencies mentioned herein. The generator is connected to the electrodes 32 by a transmission line of which the impedance may be varied by adjustment of the position of a bridging contact 93. This fact together with the following enable a precise control of the baking to be obtained and optimum results to be achieved.

(a) the electrode 32 can be adjusted to within a few millimetres of the top of the products, (b) the risks of arcing due to the vapour released by the bread are avoided by the infra-red heating of the electrode 32, (c) the area of the electrode 32 is in the proportion of one square metre for a power input of 4 kwa. with the electrodes 32, 37 at 10 centimetres apart—this proportion may be used for larger or smaller electrodes. An electrode having an area of one square metre and 4 kwa. input gives a baking time of 4 minutes for 4 kilos. of dough containing 55% water, (d) the speed of advance of the belt 27 is adjustable, and (e) the electrode 32 may be adjusted to be parallel with electrode 37 or to slope upwardly therefrom to give a non-uniform electric field.

Figure 9 shows details of the upper electrode and some modifications thereof and, in conjunction with Figure 8, the means for adjustment of the electrode. The electrode has a varnished aluminium frame 32 in which, in one construction are arranged and welded aluminium tubes 94. The tubes may be welded to the frame at both ends or at one end only the other end being free for expansion or each tube may be in two telescopic parts i.e., welded to opposite sides of the frame respectively and sliding one within the other for example at the middle of the frame. In a modified construction the tubes 94 are replaced by channels 95 welded in position. Both these constructions may be employed as shown.

The tubes, when used, are covered with insulating half-shells 96 and the channels 95 with insulating plates 97. These insulating means are formed of ceramic material or steatite and are arranged over the tops of the tubes or channels, leaving the radiating portions free at the bottom. They assist in reducing losses by radiation into the space above the electrode.

The up and down adjustment of the electrode 32 is effected by means of two hand wheels 82 by which worms 35 may be rotated in engagement with worm wheels 34. The wheels 34 form nuts for screws 33 pivotally connected by varnished steatite insulating links 81 to the frame 32. By operation of the wheels 82 the frame may be raised or lowered bodily or either end may be moved without the other. The pivotal connections of the links permits expansion of the frame. Each assembly of worm 35, wheel 34 and screw 33 is enclosed in a casing 83 with a vent which also serves as an oil hole. The electrode may be adjusted to bake products varying from say 4 millimetres up to several centimetres in thickness as well as to allow for expansion of the products.

Figure 10 shows the lower electrode 32, made of brass, forming a support for the baking belt and electrically grounded.

Inside this electrode, a casing 98 serves as a housing for the electrical resistances 38, all the terminals of which are on the same side, which facilitates their replacement since the said terminals, like those of the other resistances forming a part of heaters 31, 39 and 40, emerge on the outside of the hooding 1 of the whole assembly. A simple protective cover enables them to be protected or, in the case of a breakdown, enables the whole electric supply circiut to be brought to view and within reach.

Figure 11 shows a steam "generator" fixed at the entrance to the baking chamber, between the heating elements 31, and used to maintain a moist atmosphere in the oven chamber. It consists of a trough of stainless steel 100, at the bottom of which is fixed an immersion heater 101. If desired a cast-iron member (preserving the heat better) may be used, in which the trough 100 rests. A water supply pipe 102, regulated by a valve, permits a continuous flow of the liquid, while the pipe 103 permits the removal of the excess, and from it hot water may be usefully recovered. The presence of this steam in the oven ensures that during the initial external heating the skin of the dough is soft and elastic and so permits full expansion of the dough. This is due to condensation on the dough which enters at 30° in contrast to the oven temperature of about 280°.

Figure 12 shows a simple door system. This door 104 which is heat-insulated is controlled by means of two steel chains 105 running over two pinions 106 connected to a shaft 107. Control is effected by means of the handwheel 108 which may be provided with a regulating index. The counterweight 109 serves to balance the said door. The door may be employed at either end of the oven and carry the brushes 28 or 43.

Thermostats are provided for effecting automatic control of the various external heating means. The thermostats may be of the mercury bulb type.

The cylinders 4 and 5, the regulator 12 and the drums 13, 14, 15, 16, 20, 21, 24 and 25 are all driven in the timed relationship above described by chains and gears from a common motor (not shown).

Many modifications may be made in the above example. For instance the blades of the regulator 12 may be radial instead of curved although the curved form is preferred because it assists in maintaining the elongated dough pieces straight. Again the belt 19 may be replaced by a fixed support plate but an open mesh belt is preferred because it reduces wear on the belt 18 and also helps to ventilate the dough. Variations in the arrangement of the electrodes 32 and 37 may be made.

The oven may be used with other forms of dividers and/or moulders. It may also be combined with a kneading machine. It may be used for loaves of different shapes and weights.

I claim:

1. The method of baking leavened flour products which comprises first heating the products for approximately 5 minutes externally and without substantial crust formation to a temperature of 30–50° C., then heating the products for approximately 8 minutes solely by high-frequency dielectric heating to at least 70° C., and finally heating the product for about 7 minutes to approximately 100° C. to effect crust formation.

2. The method of baking leavened flour products according to claim 1 in which the temperature of final heating of the product to approximately 100° C. is effected with an oven temperature of approximately 270° to 280° C.

3. An oven for baking bread comprising an oven chamber, with inlet and exit openings, a conveyor for carrying a succession of lumps of dough through the chamber, from the inlet to the exit opening, means for first heating the lumps by radiant heat as they pass through one portion of the chamber, means for further heating the lumps as they pass through a second portion of the chamber comprising a pair of opposed electrodes within the chamber and positioned to receive the lumps between them, a source of high-frequency current and electrical connections from the source to the electrodes, a fermenting chamber on top of the oven chamber, said fermenting chamber also having inlet and exit openings, and a conveyor for carrying a succession of dough lumps through the fermenting chamber from the inlet to the exit opening thereof and a conveyor for carrying the lumps downwardly from the exit opening of the fermenting chamber to the inlet opening of the oven chamber and depositing the dough lumps upon the oven conveyor.

4. An oven for baking bread comprising an oven chamber, with inlet and exit openings, a conveyor for carrying a succession of lumps of dough through the chamber, from the inlet to the exit opening, means for first heating the lumps by radiant heat as they pass through one portion of the chamber, means for further heating the lumps as they pass through a second portion of the chamber comprising a pair of opposed electrodes within the chamber and positioned to receive the lumps between them, a source of high-frequency current and electrical connections from the source to the electrodes, and a brush normally disposed across at least one of the inlet and exit openings and acting as a displaceable closure therefor as the bread advances on the conveyor.

5. An oven for baking bread comprising an oven chamber, with inlet and exit openings, a conveyor for carrying a succession of lumps of dough through the chamber, from the inlet to the exit opening, means for first heating the lumps by radiant heat as they pass through one portion of the chamber, means for further heating the lumps as they pass through a second portion of the chamber comprising a pair of opposed electrodes within the chamber and positioned to receive the lumps between them, a source of high-frequency current and electrical connections from the source to the electrodes, a brush normally disposed across at least one of the inlet and exit openings and acting as a displaceable closure therefor as the bread advances on the conveyor, and means for keeping the brush moist with a suitable liquid for moistening the dough during passage thereof under the brush.

References Cited in the file of this patent

UNITED STATES PATENTS

| | | |
|---|---|---|
| 554,273 | Hueg | Feb. 11, 1896 |
| 942,154 | Van Houten | Dec. 7, 1909 |
| 1,062,795 | Pointon | May 27, 1913 |
| 1,118,030 | Lunt | Nov. 24, 1914 |
| 1,716,460 | Pointon | June 11, 1929 |
| 2,181,737 | North | Nov. 28, 1939 |
| 2,428,615 | Brown | Oct. 17, 1947 |
| 2,454,370 | Beaubien | Nov. 23, 1948 |
| 2,491,687 | Nutt | Dec. 20, 1949 |
| 2,532,460 | Phillips | Dec. 5, 1950 |
| 2,574,636 | Gareis | Nov. 13, 1951 |
| 2,785,642 | Ward | Mar. 19, 1957 |
| 2,845,880 | Warrington | Aug. 5, 1958 |

FOREIGN PATENTS

| | | |
|---|---|---|
| 35,249 | Netherlands | Apr. 15, 1935 |